United States Patent
Braceras et al.

(10) Patent No.: US 6,922,076 B2
(45) Date of Patent: Jul. 26, 2005

(54) SCALABLE TERMINATION

(75) Inventors: George M. Braceras, Essex Junction, VT (US); Reid C. Hutchins, Burlington, VT (US); Harold Pilo, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 10/604,936

(22) Filed: Aug. 27, 2003

(65) Prior Publication Data

US 2005/0046441 A1 Mar. 3, 2005

(51) Int. Cl.[7] .............................................. H03K 17/16
(52) U.S. Cl. ............................ 326/30; 326/86; 326/87; 327/108
(58) Field of Search ....................... 326/30, 86, 56–58, 326/87; 327/108

(56) References Cited

U.S. PATENT DOCUMENTS

| | | | |
|---|---|---|---|
| 6,100,713 A | | 8/2000 | Kalb et al. |
| 6,160,417 A | | 12/2000 | Taguchi |
| 6,356,106 B1 | | 3/2002 | Greeff et al. |
| 6,366,129 B1 | * | 4/2002 | Douglas et al. ................ 326/86 |
| 6,380,758 B1 | * | 4/2002 | Hsu et al. ....................... 326/30 |
| 6,452,428 B1 | * | 9/2002 | Mooney et al. ............. 327/108 |
| 6,586,964 B1 | * | 7/2003 | Kent et al. ..................... 326/30 |
| 6,642,742 B1 | * | 11/2003 | Loyer ............................ 326/30 |
| 6,762,620 B2 | * | 7/2004 | Jang et al. ..................... 326/30 |
| 2002/0005734 A1 | | 1/2002 | Braceras et al. |
| 2002/0050838 A1 | | 5/2002 | Kim et al. |
| 2002/0053923 A1 | | 5/2002 | Kim et al. |

* cited by examiner

*Primary Examiner*—Vibol Tan
(74) *Attorney, Agent, or Firm*—Dugan & Dugan, P.C.; Robert A. Walsh

(57) ABSTRACT

In a first aspect, a first method is provided for providing multiple termination values using a plurality of binary termination signals. The first method includes the steps of (1) determining a characteristic impedance of a first port by generating a plurality of binary termination signals; and (2) modifying a characteristic impedance of a second port by manipulating one or more of the plurality of binary termination signals. Numerous other aspects are provided.

21 Claims, 8 Drawing Sheets

US 6,922,076 B2

SCALABLE TERMINATION

BACKGROUND OF INVENTION

1. Field of the Invention

The present invention relates generally to integrated circuits, and more particularly to methods and apparatus for programmable and/or scalable terminations within integrated circuits.

2. Background

As the speed of transmission lines included in memory interfaces and buses increases, impedance "matching" become increasingly important. The characteristic impedance of a transmission line is the ratio of voltage to current of a signal moving along the transmission line. By terminating the transmission line with a load (e.g., an impedance) equal to the characteristic impedance of the transmission line, a signal pulse applied to the transmission line is transferred to the load without reflection. The benefits of impedance matching, such as reduced signal reflection and signal loss during signal transmission, are well known to one of skill in the art and is not be described further herein.

FIG. 1 is a diagram of a conventional programmable termination circuit 100. The programmable termination circuit 100 includes an impedance evaluation control circuit 102 coupled to a resistive element 104. The resistive element 104 is coupled to a port 106 included in a memory system (not shown). The port 106 may correspond to a transmission line included in a bus for the memory system, or a memory interface, for example.

The resistive element 104 includes an upper portion 108 of circuitry including a plurality of p-channel metal-oxide semiconductor field-effect transistors (PFETs) P0–P7 connected in parallel between a high voltage level (e.g., $V_{DDQ}$) and the port 106. The PFET P0 is a default device that is always on and determines (along with NFET N0) the maximum impedance that may be created by the resistive element 104. The PFETs P1–P7 are arranged in size order such that PFET P1 is the narrowest transistor and PFET P7 is the widest transistor.

The resistive element 104 includes a lower portion 110 of circuitry including a plurality of n-channel metal-oxide semiconductor field-effect transistors (NFETs) N0–N7 connected in parallel between the port 106 and ground. The NFET N0 is a default device that is always on and determines (along with PFET P0) the maximum impedance that may be created by the resistive element 104. The NFETs N1–N7 are arranged in size order such that NFET N1 is the narrowest transistor and NFET N7 is the widest transistor.

The upper portion 108 of circuitry is connected in series with the lower portion 110 of circuitry to create a voltage divider that provides a termination for a signal output from circuitry that employs the programmable termination circuit 100. The terminated impedance is created by the resistive element 104, on the port 106. Each PFET, NFET combination (e.g., P0-N0, P1-N1, P2-N2, etc.) is referred to herein as a stacked transistor pair. However, it should be understood that each of the transistors PFETs P1–P7 and NFETs N1–N7 may operate independently.

The impedance evaluation control logic 102 outputs a fixed set of control or binary termination signals (e.g., binary counts) p1–p7 and n1–n7 to the PFETs P1–P7 and NFETs N1–N7, respectively, for selectively activating or de-activating the transistors (thereby creating a resistive element 104 of a fixed impedance (e.g., once programmed via the impedance evaluation control logic 102 described below with reference to FIG. 2), which is used for outputting a signal on the port 106). In one embodiment, the most significant bit of a binary count is provided to the widest transistor, and the least significant bit is provided to the narrowest transistor. As stated, because the default devices P0, N0 are always on, the default devices P0, N0 sets the maximum impedance value of the resistive element 104.

FIG. 2 is a diagram of the conventional impedance evaluation control circuit 102 of FIG. 1. The impedance evaluation control circuit 102 may include control logic 202 coupled to a plurality 204 of PFETs 204a–h connected in parallel between a high voltage level (e.g., $V_{DDQ}$) and a port 206 (e.g., a chip pad) included, for example, in a memory system (not shown). The PFETs 204a–h may be arranged in size order in a manner similar to the PFETs P1–P7 included in the upper portion 108 of the resistive element 104 of FIG. 1.

The control logic 202 may be coupled to the port 206 via a feedback line 208. A resistor 210 (e.g., an external resistor connected to a system board) is coupled between the port 206 and ground. Consequently, the impedance evaluation control circuit 102 acts as a voltage divider.

The control logic 202 outputs bits of a binary count signal (e.g., signals p1–p7) to the plurality 204 of PFETs 204a–h, respectively, and in response thereto receives a value indicating the voltage at the port 206 via the feedback line 208. In one embodiment, the most significant bit of the binary count signal is provided to the widest transistor, and the least significant bit is provided to the narrowest transistor. The control logic 202 compares the voltage at the port 206 with a reference voltage (e.g., a desired value such as $V_{DDQ}/2$) included in the control logic 206 and outputs a different binary count signal until the voltage at port 206 matches the reference voltage (e.g., $V_{DDQ}/2$). Once the voltage at port 206 matches the reference voltage, the impedance evaluation control circuit 102 fixes and outputs the binary count (e.g., control signals p1–p7) used for creating the voltage at port 206 to the PFETs P1–P7 of FIG. 1. Although not shown in FIG. 2, the impedance evaluation control circuit 102 may create control signals n1–n7 in a similar manner and provide the same to the NFETs N1–N7 of FIG. 1. In this manner, the impedance evaluation control circuit 102 generates control or binary termination signals p1–p7, n1–n7 used for creating a resistive element 104 (e.g., terminator) of a fixed impedance (e.g., the characteristic impedance) based on the value of the external resistor 210. Thus, the conventional impedance evaluation control circuit 102 determines a characteristic impedance of a port by generating a plurality of binary termination signals.

Different applications and different types of signals corresponding to an application, such as data, address, and/or clock signals, may require different termination values for optimal transmission. Although a different programmable termination circuit 100 may be used for creating the required termination value for each different port of an application (e.g., a memory system) such a solution requires the above circuitry for each port.

SUMMARY OF INVENTION

To overcome the disadvantages of the prior art, in one or more aspects of the present invention, methods and apparatus for scalable terminations within integrated circuits are provided. For example, in a first aspect of the invention, a first method is provided for providing multiple termination values using a plurality of binary termination signals. The first method includes the steps of (1) determining a characteristic impedance of a first port by generating a plurality of binary termination signals; and (2) modifying a characteristic impedance of a second port by manipulating one or more of the plurality of binary termination signals.

In a second aspect of the invention, a second method is provided for providing multiple termination values using a set of control signals. The second method includes the steps of (1) employing the set of control signals to provide a fixed output impedance on a first port; and (2) employing the set of control signals to provide a variable output impedance on a second port. Numerous other aspects are provided, as are systems and apparatus in accordance with these and other aspects of the invention.

Other features and aspects of the present invention will become more fully apparent from the following detailed description, the appended claims and the accompanying drawings.

DETAILED DESCRIPTION

Figure 3:
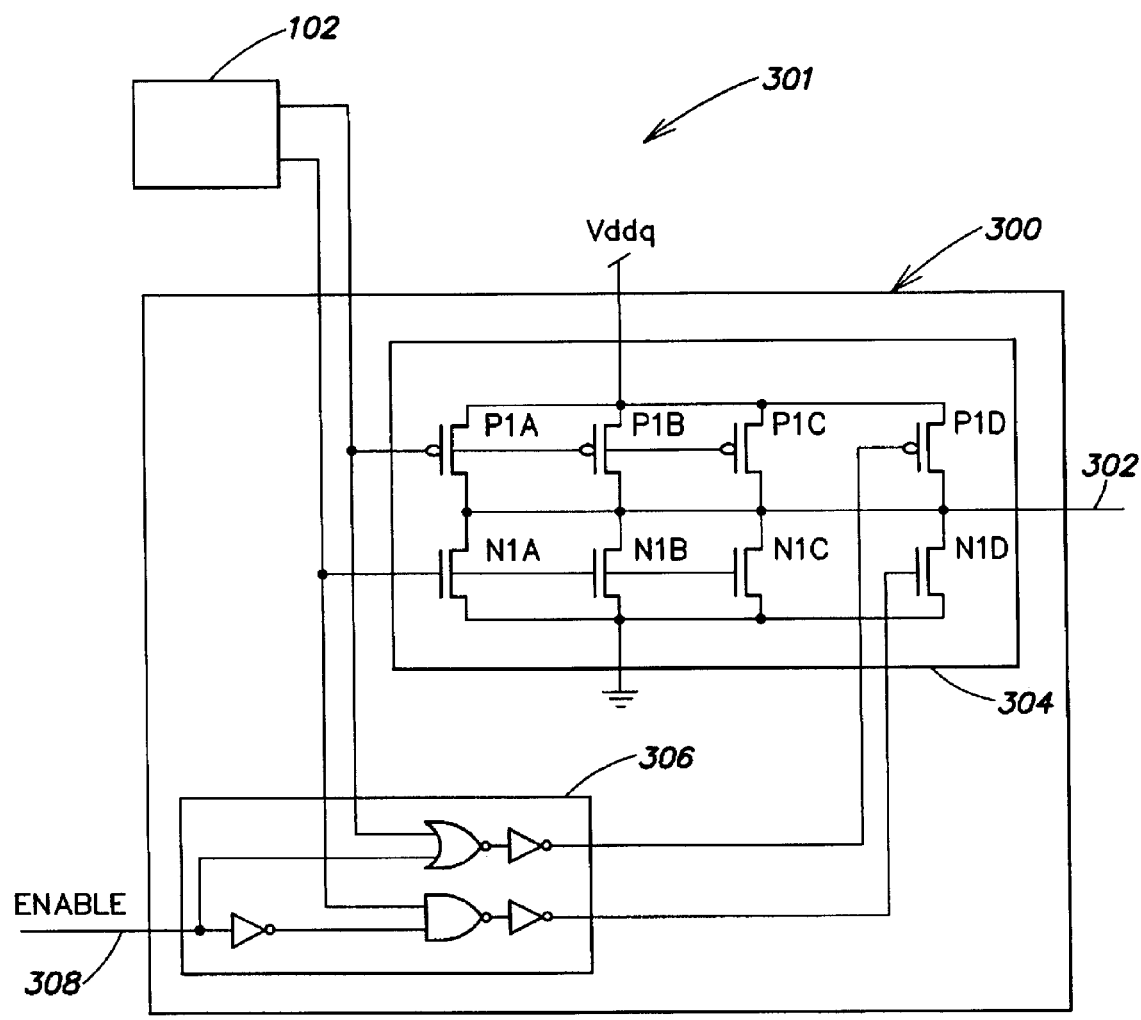
FIG. 3 is a block diagram of a first exemplary scalable termination circuit provided in accordance with the present invention.

FIG. 3 is a block diagram of a first exemplary scalable termination circuit 301 provided in accordance with the present invention. The scalable termination circuit 301 provides a variable termination on a transmission line coupled to a port 302. The scalable termination circuit 301 includes scalable termination logic 300 having a resistive element 304 coupled to the port 302 of a memory system, transistor enable logic 306 and the conventional impedance evaluation control circuit 102. The resistive element 304 and the transistor enable logic 306 may be coupled to and receive control signals p1–p7, n1–n7 from the conventional impedance evaluation control circuit 102. When a logic enable signal, ENABLE, is not asserted via an input 308 of the transistor enable logic 306, the scalable termination logic 300 provides a first termination value on the port 302. Alternatively, when the logic enable signal, ENABLE, is asserted, the scalable termination logic 300 provides or outputs a second termination value on the port 302.

Figure 1:
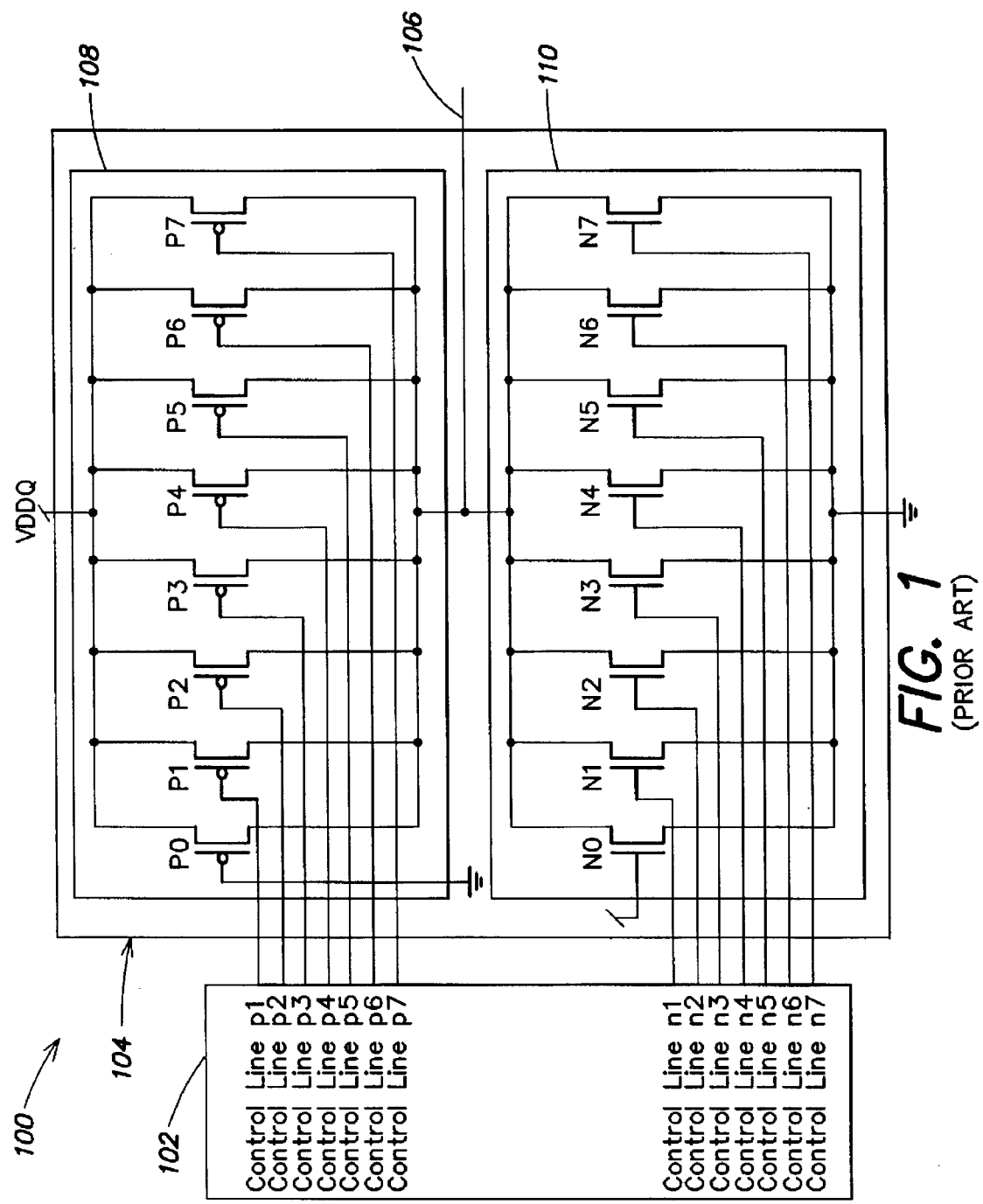
FIG. 1 is a diagram of a conventional programmable termination circuit.
Figure 2:
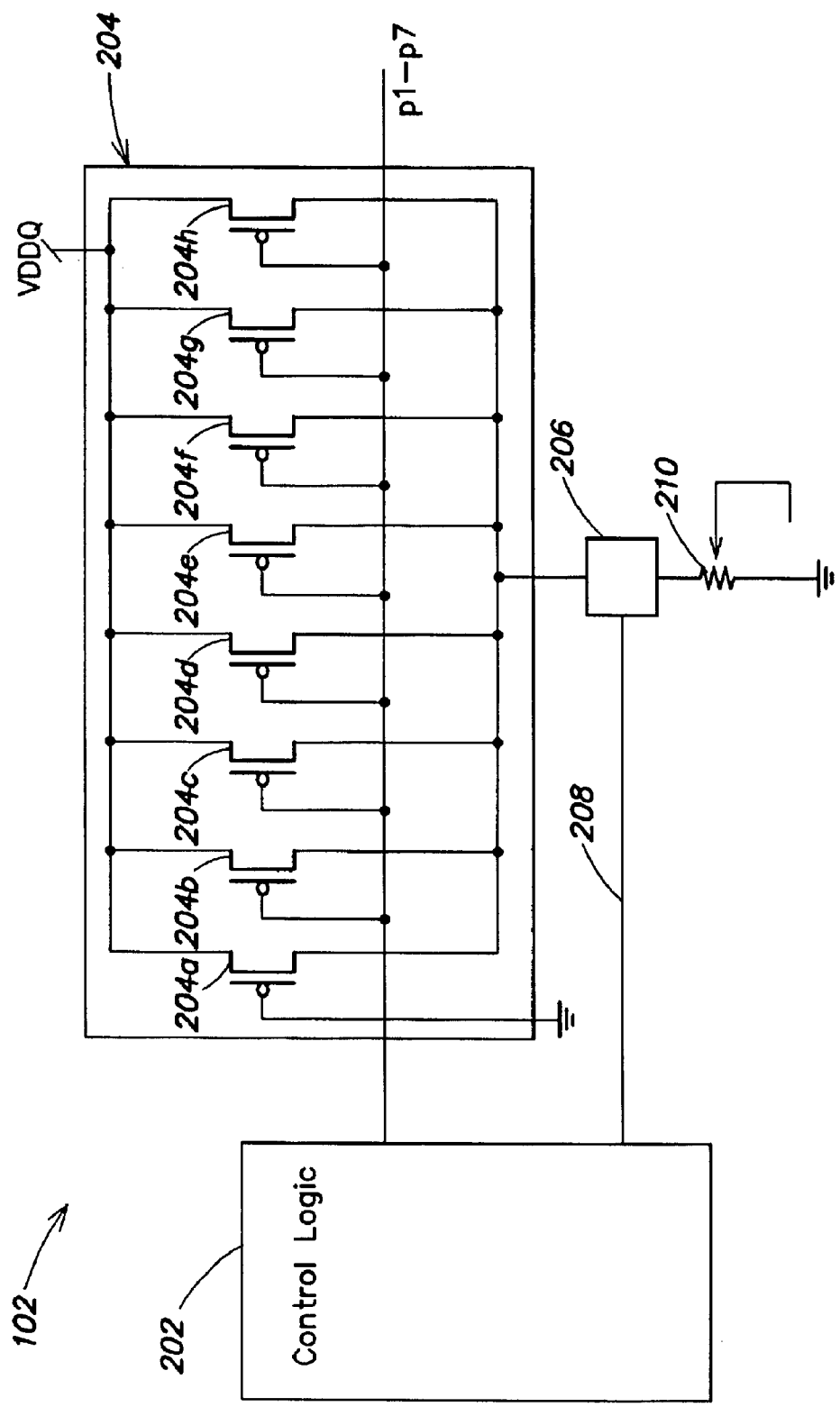
FIG. 2 is a diagram of the conventional impedance evaluation control circuit of FIG. 1.

In one embodiment, the resistive element 304 may include a plurality of transistors similar to the transistors (e.g., P1, P2, N1, N2, etc.) of resistive element 104 shown in FIG. 1. However, for each transistor (e.g., P1) included in the resistive element 104, the resistive element 304 includes a group of transistors (e.g., P1A-P1B-P1C-P1D), referred to as a fingered transistor set, connected in parallel. The width of each transistor included in the fingered transistor set is the width of the transistor (e.g., P1) shown in FIG. 1 to which the fingered transistor set (e.g., P1A-P1B-P1C-P1D) corresponds reduced by a factor based on the number of transistors in the fingered transistor set. For example, the group of PFETs P1A-P1B-P1C-P1D shown in FIG. 3 corresponds to the transistor P1 shown in FIG. 1. Each of the PFETs P1A–P1D is ¼ the width of transistor P1. Likewise, the group of NFETs N1A-N1B-N1C-N1D shown in FIG. 3 corresponds to the transistor N1 shown in FIG. 1; and each of the NFETs N1A–N1D is ¼ the width of transistor N1.

The group of PFETs P1A–P1D may be connected in series with the group of NFETs N1A–N1D as shown. Consequently, the programmable termination circuit 300 includes a stacked fingered transistor pair P1A–P1D/ N1A–N1D, which include a plurality of stacked transistor pairs (e.g., P1A-N1A, P1B-N1B, P1C-N1C, P1D-N1D), corresponding to the stacked transistor pair P1-N1 shown in FIG. 1.

Although the resistive element 304 only illustrates one stacked fingered transistor pair P1A–P1D/N1A–N1D that corresponds to the stacked transistor pair P1-N1 included in the resistive element 104 of FIG. 1, it should be understood that in practice the resistive element 304 includes a stacked fingered transistor pair that corresponds to each of the remaining stacked transistor pairs (e.g., P2-N2, P3-N3, P4-N4, P5-N5, P6-N6, and P7-N7) shown in FIG. 1. Although not illustrated, the resistive element 304 may include a stacked fingered transistor pair that corresponds to the default stacked transistor pair (e.g., P0-N0) shown in FIG. 1.

The signals (e.g., modified or manipulated control signals) output by the transistor enable logic 306 may be coupled to and selectively activate or de-activate one or more stacked transistor pairs (e.g., P1D-N1D) in each stacked fingered transistor pair (e.g., P1A–P1D/N1A–N1D). For example, if the logic enable signal, ENABLE, is not asserted, the scalable termination logic 300 outputs a first termination value (e.g., the characteristic impedance of the transmission line coupled to the port 302 with transistors P1D-N1D on). Alternatively, if the transistor enable logic, enable signal, ENABLE, is asserted, the scalable termination logic 300 outputs a second termination value that is a scaled value of the first termination value (as the stacked transistor pair P1D-N1D are off).

The numerator of the scaling factor provided by the scalable termination logic 300 is the number of stacked transistor pairs included in each stacked fingered transistor pair when the enable signal is of a first logic state. The denominator of the scaling factor is the number of stacked transistor pairs that are activated in each stacked fingered transistor pair, which includes stacked transistor pairs that are activated by the control signals provided by the impedance evaluation control circuit 102 when the enable signal is of a second logic state. Therefore, the exemplary scalable termination logic 300 shown in FIG. 3 may scale or adjust the first termination value by ⁴⁄₃ when the logic 306 enable signal, ENABLE, is asserted. Through use of the scalable termination logic 300 shown in FIG. 3, a variable termination value may be provided on a port 302 using control signals provided by transistor enable logic 306 and the impedance evaluation control circuit 102.

Figure 4:
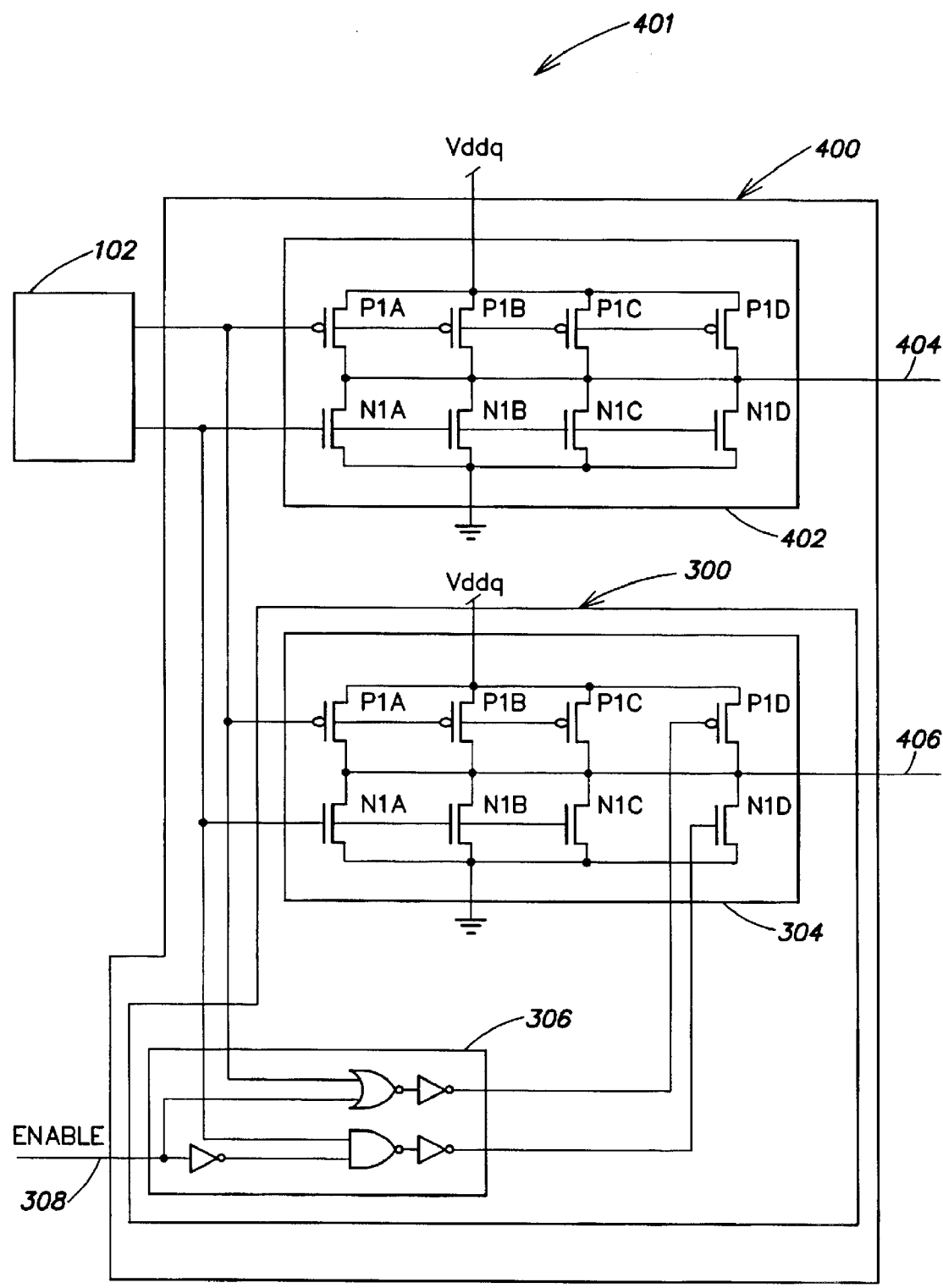
FIG. 4 is a block diagram of a second scalable termination circuit for providing a fixed termination value on a first port and a variable termination value on a second port using a single set of control signals in accordance with an embodiment of the present invention.

FIG. 4 is a block diagram of a second scalable termination circuit 401 for providing a fixed termination value on a first port and a variable termination value on a second port using a single set of control signals in accordance with an embodiment of the present methods and apparatus. The second scalable termination circuit 401 includes scalable termination logic 400 having a first resistive element 402 coupled to a first port 404 of a memory system (not shown) and the conventional impedance evaluation control circuit 102. The scalable termination logic 400 includes the scalable termination logic 300 shown in FIG. 3 coupled to a second port 406 of the memory system. The conventional impedance evaluation control circuit 102 may be coupled to and provide signals to the first resistive element 402 and the resistive element 304 of the scalable termination logic 300, which serves as a second resistive element in the scalable termination logic 400.

The structure of the first resistive element 402 may be similar to the structure of the resistive element 104 shown in FIG. 1. However, the first resistive element 402 includes a fingered transistor set (e.g., a group of transistors connected in parallel) for each transistor included in the resistive element 104 shown in FIG. 1. Therefore, the scalable termination logic 400 includes a stacked fingered transistor pair P1A–P1D/N1A–N1D corresponding to the stacked transistor pair P1-N1 of FIG. 1. Although the first resistive element 402 shown in FIG. 4 illustrates only one stacked fingered transistor pair P1A–P1D/N1A–N1D, it should be understood that the first resistive element 402 includes a stacked fingered transistor pair for each of the remaining stacked transistor pairs included in the resistive element 104 shown in FIG. 1. Although not illustrated, the first resistive element 402 may include a stacked fingered transistor pair that corresponds to the default stacked transistor pair (e.g., P0-N0) shown in FIG. 1. Because the structure of the scalable termination logic 300 was described in detail above, it is not described again herein.

In operation, the scalable termination circuit 401 employs a set of control signals for providing a fixed output impedance on a first port. More specifically, the first resistive element 402 of the scalable termination logic 400 may receive control signals (e.g., binary counts) p1–p7, n1–n7 from the conventional impedance evaluation control circuit 102 that serve to selectively activate or deactivate one or more stacked transistor pairs (e.g., P1D-N1D in each stacked fingered transistor pair (e.g., P1A–P1D/N1A–N1D) to create a resistive element of a fixed impedance. Because the resistive element 402 is coupled to the first port 404, an output impedance (e.g., the characteristic impedance) is provided on the first port 404 based on the set of control signals. The output impedance terminates a transmission line coupled to the first port 404.

A set of control signals may be employed to provide a variable output impedance on a second port. The conventional impedance evaluation circuit 102 may provide the same set of control signals p1–p7, n1–n7 provided to the first resistive element 402 to the scalable termination logic 300. As stated above while describing FIG. 3, the control signals p1–p7, n1–n7 along with secondary control signals output by the transistor enable logic 306 may serve to selectively activate or de-activate one or more stacked transistor pairs included in one or more stacked fingered transistor pairs (e.g., P1A–P1D/N1A–N1D of the second resistive element 304 to create a resistive element 304 of a first impedance. However, it should be understood that these transistors operate (e.g., may be activated) independently. If a logic 306 enable signal, ENABLE, is asserted, the transistor enable logic 306 may modify or manipulate one or more portions of the control signals p1–p7, n1–n7 and output modified secondary control signals to the resistive element 304. The control signals p1–p7, n1–n7 along with the modified secondary control signals serve to selectively activate or de-activate one or more stacked transistor pairs (e.g., P1D-N1D) included in one or more stacked fingered transistor pairs of the second resistive element 304. In this manner, the resistive element 304 may be modified to create another (e.g., a second) impedance. Because the resistive element 304 may be modified and is coupled to the second port 406, an impedance that may be adjusted (e.g., a variable impedance) is provided or output on the second port 406 based in part on the control signals p1–p7, n1–n7.

The scalable termination circuit 401 uses resistive elements that include stacked fingered transistor pairs to provide a fixed termination value on a first port and a variable termination value on a second port using a single set of control signals. Because only a single set of control signals are provided to the scalable termination logic 400, only a single impedance evaluation circuit 102 is required.

Although using a stacked fingered transistor pair, which corresponds to a stacked transistor pair included in the resistive element 104, in the resistive elements 304, 402, may allow impedance to be varied simply, it may be difficult to replace the narrow transistors included in the resistive element 104 with fingered transistors, because dividing a narrow transistor into four transistors, each of which are ¼ the width, for example, may require the width of each transistor included in the fingered transistor to be below a design rule minimum required for optimal model accuracy and therefore, may be impractical.

Figure 5:
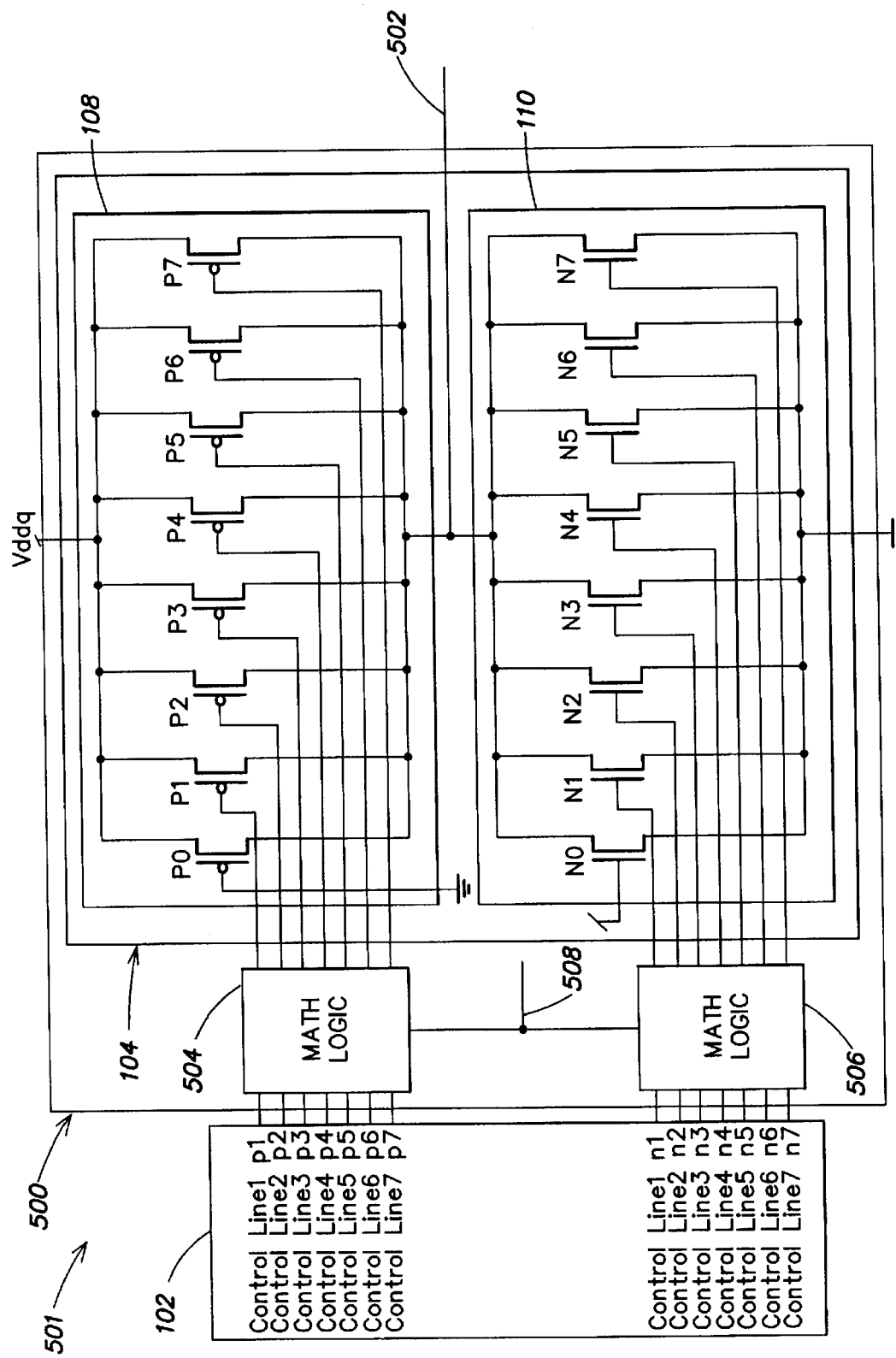
FIG. 5 is a block diagram of a third scalable termination circuit for providing a variable impedance on a port of a memory system in accordance with the present invention.

FIG. 5 is a block diagram of a third scalable termination circuit 501 for providing variable impedance on a port of a memory system in accordance with the present invention. The third scalable termination circuit 501, includes scalable termination logic 500, which is coupled to the impedance evaluation control circuit 102, having the resistive element 104, which includes the upper portion 108 of circuitry and the lower portion 110 of circuitry, coupled to a port 502 of a memory system. The resistive element 104 was described above and is not described again in detail herein. The upper portion 108 of circuitry may be coupled to math logic 504, and the lower portion 110 of circuitry may be coupled to math logic 506. The math logic 504, 506 is coupled to and receives control signals p1–p7, n1–n7, respectively, from the conventional impedance evaluation circuit 102. The math logic 504, 506 may receive an input from a line 508 coupled to a fuse (not shown) or a register (not shown), such as a programmable register, indicating a mathematical operation to be performed on the control signals p1–p7, n1–n7. The math logic 504, 506 may include combinational and/or sequential logic or may be implemented using an application specific integrated circuit (ASIC).

The scalable termination circuit 501 receives control signals p1–p7, n1–n7 from the impedance evaluation circuit 102 that when applied directly to the resistive element 104 create an original impedance (e.g., a characteristic impedance) on a port 502 to which the resistive element 104 is connected. The scalable termination logic 500 modifies or manipulates one or more of the control signals p1–p7, n1–n7 using math logic 504, 506, and adjusts the value of the impedance on the port 502 using the modified control signals. More specifically, the math logic 504 may receive a portion of the control signals p1–p7 (e.g., a binary count)

output by the impedance evaluation circuit 102 and receive a scaling factor (e.g., a factor by which to modify the control signals) from a fuse (not shown) or register (not shown) via line 508. The math logic 504 may perform a multiplication and/or division operation on the binary count p1–p7 to modify the control signals p1–p7 appropriately such that they (along with modified control signals n1–n7) may be used to modify the impedance on the port 502 as required by the scaling factor. Because the impedance varies in proportion to the inverse of the binary count, a 4/3 increase in impedance may be achieved by reducing the binary count by 3/4, for example. The math logic 506 modifies the control signals n1–n7 in a similar manner. Although FIG. 5 illustrates a first math logic 504 that modifies the control signals p1–p7 and a second math logic 506 that modifies the control signals n1–n7, it should be understood that a single math logic may be used for modifying the control signals p1–p7, n1–n7.

The math logic 504, 506 outputs the modified control signals to the resistive element 104. The modified signals may serve to selectively activate or de-activate one or more stacked transistor pairs (e.g., P1-N1 and P2-N2) included in the resistive element 104, which modifies the structure and therefore the impedance of the resistive element 104. Because the resistive element 104 is coupled to the port 502, a second impedance, which may be scaled or adjusted version of the original impedance, is provided or output on the port 502 based on the modified control signals. Although using math logic 504, 506 to modify control signals p1–p7, n1–n7, which are used for creating an original impedance on a port, may provide a method of scaling the impedance on the port, because the default transistors P0, N0 included in the resistive element 104 do not receive modified control signals, they are unaffected by the changes made by the math logic 504, 506. Therefore, every transistor included in the resistive element 104 does not receive an adjustment based on the scaling factor. Consequently, the modified impedance output on the port 502 does not accurately reflect the original impedance (e.g., characteristic impedance) modified (e.g., multiplied or divided) by the scaling factor.

Figure 6A:
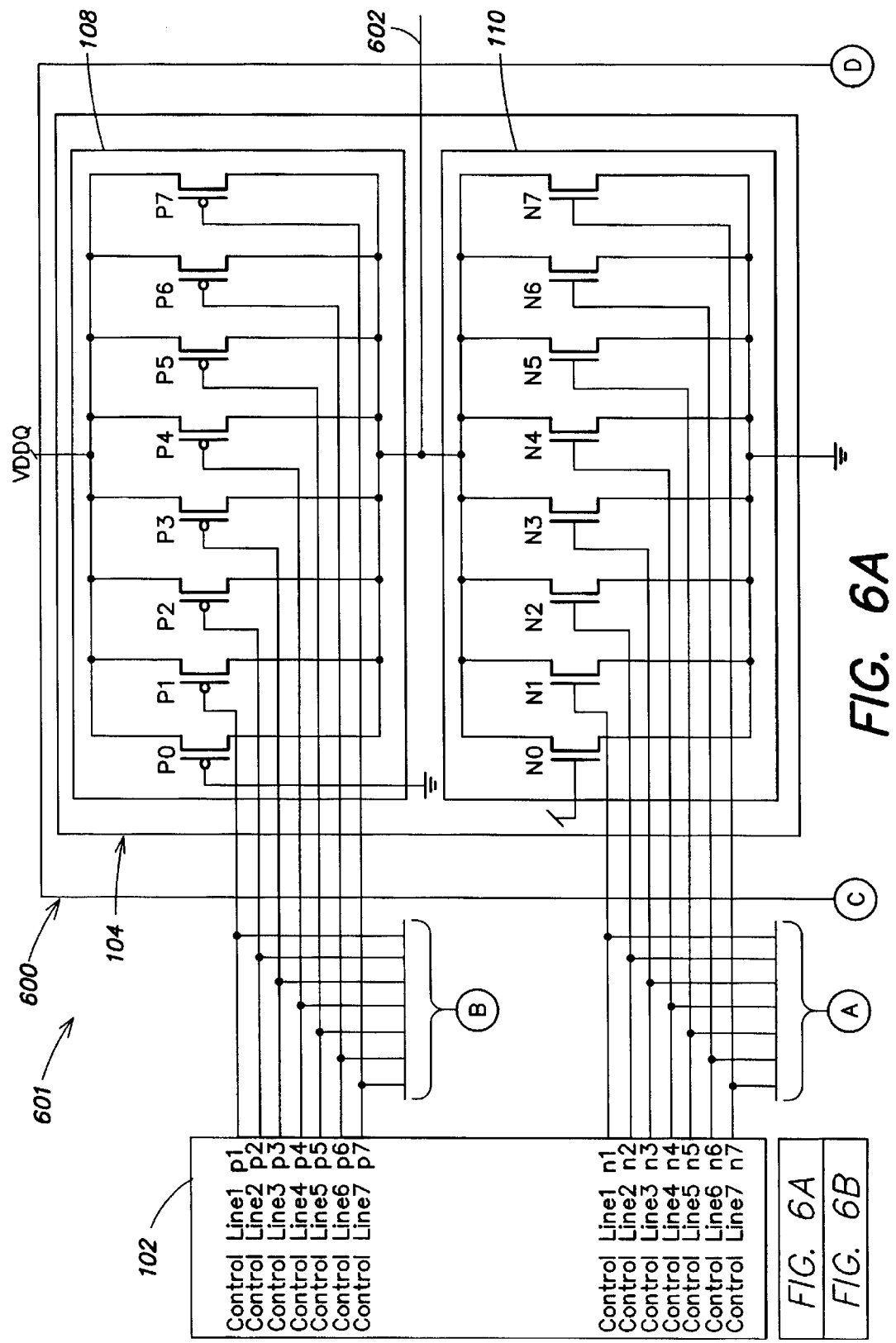
FIGS. 6A and 6B are a block diagram of a fourth exemplary scalable termination circuit for providing a fixed termination value on a first port and a variable termination value on a second port using a single set of control signals in accordance with an embodiment of the present invention.
Figure 6B:
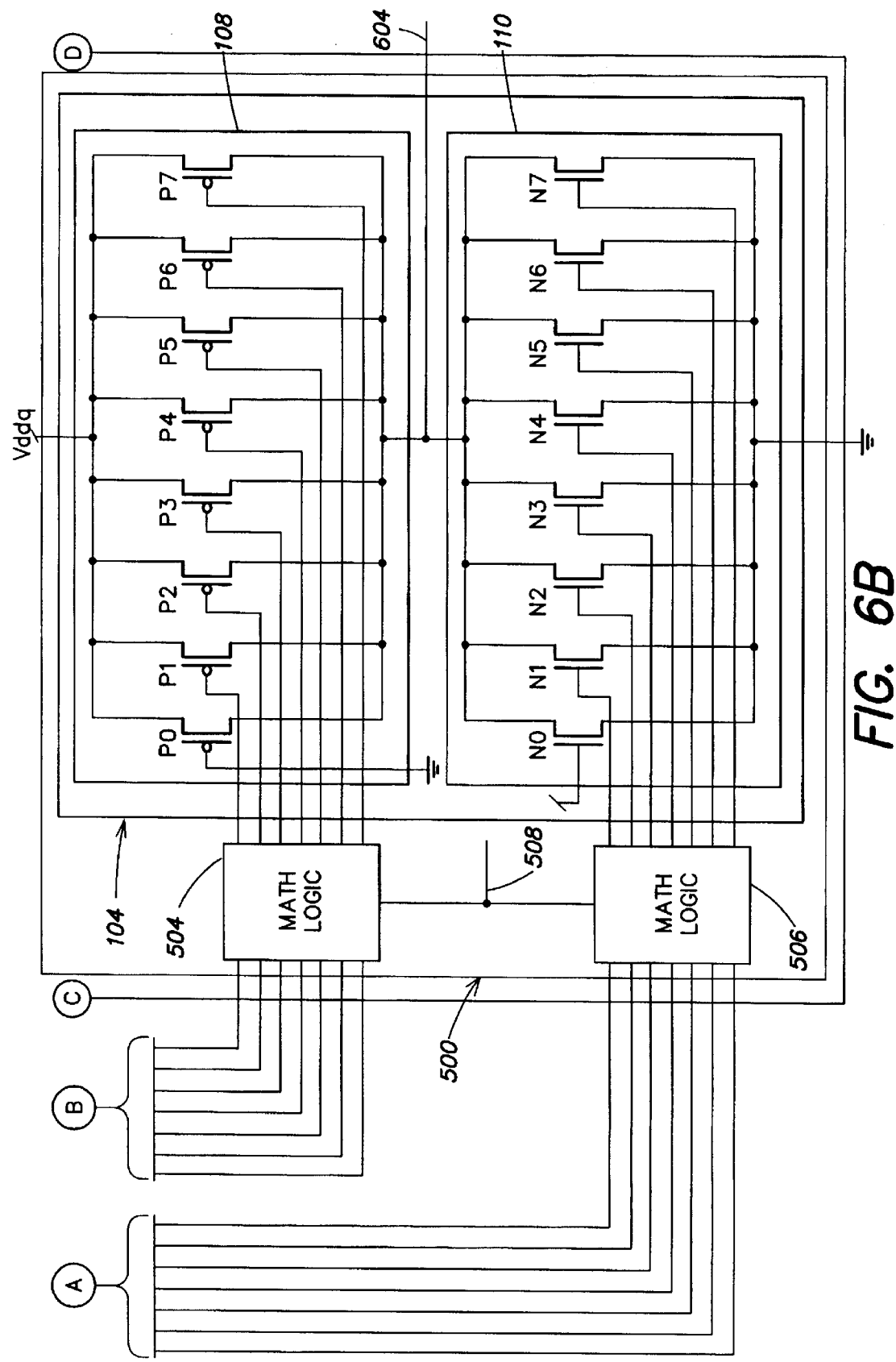

FIGS. 6A and 6B are a block diagram of a fourth exemplary scalable termination circuit 601 for providing a fixed termination value on a first port and a variable termination value on a second port using a single set of control signals in accordance with an embodiment of the present invention. Therefore, the scalable termination logic 600 only requires a single impedance evaluation circuit. The fourth scalable termination circuit 601 includes scalable termination logic 600, which is coupled to the conventional impedance evaluation control circuit 102, having a first resistive element 104 (e.g., the programmable termination circuit 104 shown in FIG. 1) coupled to a first port 602. The scalable termination logic 600 may include a second resistive element 104 (e.g., the resistive element 104, included in the scalable termination logic 500 shown in FIG. 5) coupled to a second port 604. Because both the programmable termination circuit 104 and the scalable termination logic 500 were described above, they are not described again in detail herein. The scalable termination circuit 104 and the scalable termination logic 500 may be coupled to and receive control signals p1–p7, n1–n7 from the impedance evaluation circuit 102.

In operation, the scalable termination circuit 601 employs a set of control signals for providing a fixed output impedance on a first port 602. More specifically, the first resistive element 104 of the scalable termination circuit 601 may receive control signals (e.g., a binary count) p1–p7, n1–n7 from the impedance evaluation control circuit 102 that serve to selectively activate or de-activate one or more stacked transistor pairs (e.g., P1-N1, P2-N2, and P3-N3) for creating a resistive element 104 of a fixed impedance. Because the resistive element 104 is coupled to the first port 602, an output impedance (e.g., the characteristic impedance) is provided on the first port 602 based on the control signals p1–p7, n1–n7.

The same set of control signals may be employed to provide a variable output impedance on the second port 604. More specifically, the impedance evaluation circuit 102 may provide control signals p1–p7, n1–n7 to the scalable termination logic 500. As stated above while discussing the scalable termination circuit 500, math logic 504, 506 may receive and modify or manipulate the control signals p1–p7, n1–n7, respectively, and output the modified control signals to the second resistive element (e.g., the resistive element 104 included in the programmable termination circuit). As stated above, the math logic 504, 506 modifies the control signals p1–p7, n1–n7 based on adjustable scaling factors, which may be provided by a fuse (not shown) or a register (not shown), such as a programmable register, via an input 508. The modified control signals may serve to selectively activate or de-activate one or more stacked transistor pairs (e.g., P1-N1, P2-N2) included in the second resistive element to create a resistive element having an impedance that is a scaled version of the impedance created on the first port 602.

By modifying the scaling factor provided to the math logic 504, 506, the math logic 504, 506 may output a different set of modified control signals. The different set of modified control signals may be used for creating a resistive element (e.g., the resistive element 104 included in the programmable termination circuit) having a different impedance, which is a scaled or adjusted version of the impedance created on the first port 602. Because the resistive element 104 included in the scalable termination logic 500 is coupled to the second port 604 and the impedance created by the resistive element included in the scalable termination logic 500 may be varied, a variable impedance is provided or output on the second port 604 based on the control signals p1–p7, n1—n1.

The scalable termination logic 600 uses resistive elements coupled to math logic for providing a fixed termination value on a first port and a variable termination value on a second port using a single set of control signals. Because only a single set of control signals are provided to the scalable termination logic 600, only a single impedance evaluation circuit is required.

Although using math logic 504, 506 for modifying control signals, which are used to create an impedance on a port, may provide a method of scaling an impedance on the same or another port, because the default transistors P0, N0 included in the resistive element 104 and the resistive element included in the scalable termination circuit 500 do not receive modified control signals they are unaffected by the changes made by the math logic 504, 506. Therefore, every transistor included in the resistive elements does not receive an adjustment based on the scaling factor. Consequently, the modified impedance output on the port 602, 604 does not accurately reflect the characteristic impedance modified (e.g., multiplied or divided) by the scaling factor.

Figure 7:
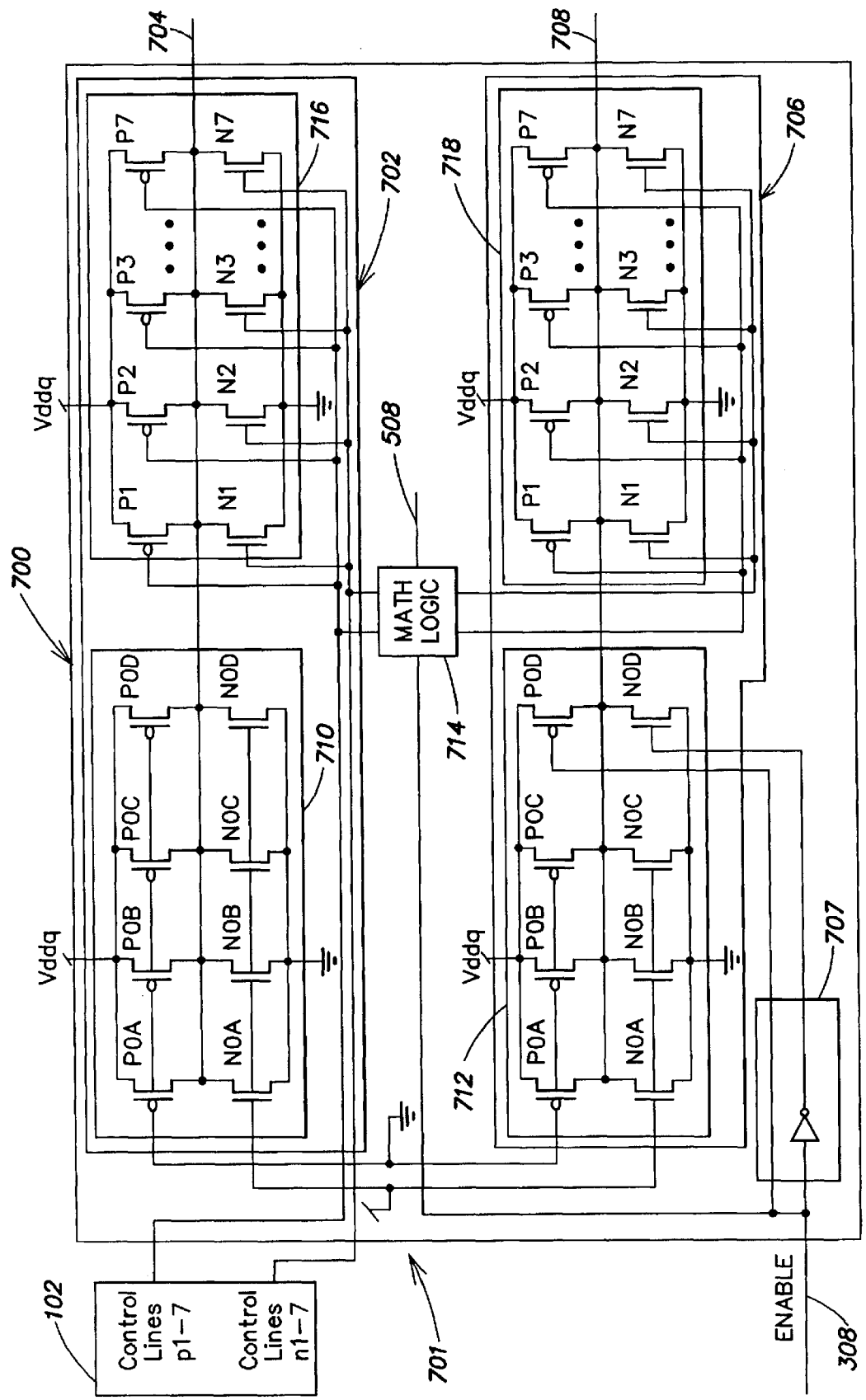
FIG. 7 is a block diagram of a fifth exemplary scalable termination circuit for providing a fixed termination value on a first port and a variable termination value on a second port using a single set of control signals in accordance with an embodiment of the present invention.

FIG. 7 is a block diagram of a fifth exemplary scalable termination circuit for providing a fixed termination value on a first port and a variable termination value on a second port using a single set of control signals in accordance with an embodiment of the present invention. The scalable termination circuit 701 includes scalable termination logic 700, which is coupled to the impedance evaluation control circuit 102, having a first resistive element 702 coupled to a first port 704 and a second resistive element 706 coupled to a second port 708. The first resistive element 702 is coupled to and receives control signals from impedance evaluation control logic 102. The second resistive element 706 is coupled to and receive control signals from math logic 714, which is coupled to and receives control signals from the impedance evaluation control logic 102. The second resistive element 706 may be coupled to and receive control signals (e.g., secondary control signals) from transistor enable logic 707. The transistor enable logic 707 and the math logic 714 may be coupled to a logic enable signal, ENABLE, via an input 308, that serves to activate the transistor enable logic 707 and math logic 714. The math logic 714 may be coupled to a fuse (not shown) or a register (not shown), such as a programmable register, via an input 508, that indicates a scaling factor (e.g., a factor by which to modify the control signals).

The structure of the first resistive element 702 is similar to the structure resistive element 104 included in the programmable termination circuit 100 of FIG. 1. In contrast to the resistive element 104, each default transistor of the first resistive element 702 is a fingered transistor set. For example, the default PFET includes transistors P0A, P0B, P0C, and P0D connected in parallel to form a fingered transistor set. Each of the transistors P0A, P0B, P0C, P0D included in the default PFET are connected to ground such that the default fingered PFET set is always on. Similarly, the default NFET includes transistors N0A, N0B, N0C, and N0D connected in parallel to form a fingered transistor set. Each of the transistors N0A, N0B, N0C, N0D included in the default NFET are connected to a high voltage level (e.g., a logic "1") such that the default fingered NFET is always on. A PFET from the default fingered transistor set P0A–P0D may be coupled to a corresponding NFET from the default fingered transistor set N0A–N0D to create a plurality of stacked transistor pairs (e.g., P0A-N0A, P0B-N0B) and thereby creating a stacked fingered transistor pair (e.g., P0A–P0D/N0A–N0D) 710.

The structure of the second resistive element 706 is similar to the first resistive element 702. In contrast to the first resistive element 702, one or more stacked transistor pairs (e.g., P0D-N0D) included in the default stacked fingered transistor pair 712 (e.g., P0A–P0D/N0A–N0D), may be coupled to the logic enable signal, ENABLE, and an output of transistor enable logic 707, respectively. Remaining transistors 718 (e.g., P1–P7, N1–N7) included in the second resistive element 706 may be coupled to an output of the math logic 714. A PFET from the remaining transistors 718 may be coupled to a corresponding NFET in the remaining transistors 718 to create a plurality of stacked transistor pairs (e.g., P1-N1, P2-N2, etc.).

In operation, the scalable termination circuit 701 employs a set of control signals p1–p7, n1–n7 for providing a fixed output impedance on a first port 704. More specifically, the default stacked fingered transistor pair 710 is always on and is connected in parallel to the remaining transistors 716 (e.g., stacked transistor pairs P1-N1 to P7-N7) included in the first resistive element 702. The remaining transistors 716 included in the first resistive element 702 of the scalable termination circuit 700 may receive control signals (e.g., binary counts) p1–p7, n1–n7 from the impedance evaluation control circuit 102 that serve to selectively activate or de-activate one or more of the stacked transistors (e.g., P1–N1 to P7–N7) to create a resistive element 702 of a fixed impedance. Because the resistive element 702 is coupled to the first port 704, an output impedance (e.g., the characteristic impedance) is provided on the first port 704 based on the control signals p1–p7, n1–n7.

The same set of control signals may be employed for providing a variable impedance on the second port 708. More specifically, the impedance evaluation control circuit 102 may provide the same control signals p1–p7, n1–n7 provided to the first resistive element 702 to the math logic 714. When the logic 707 enable signal, ENABLE, coupled to the math logic 714 is asserted, the math logic 714 modifies or manipulates the control signals p1–p7, n1–n7 output by the impedance evaluation control circuit 102 as indicated by an adjustable scaling factor provided to the math logic 714 (e.g., via the input 508). In one embodiment, the math logic 714 may perform a multiplication and/or division operation on the control signals p1–p7, n1–n7 (e.g., the binary counts) as required by the scaling factor. The math logic 714 outputs modified control signals, which may be used to selectively activate or deactivate one or more stacked transistor pairs (e.g., P1-N1, P2-N2) included in the remaining transistors 718 of the second resistive element 706, to create a resistive element using the remaining transistor 718 having an impedance that is a scaled version of the impedance created by the remaining transistors 716 of the first resistive element 702.

By modifying the scaling factor provided to the math logic 714, the math logic 714 may output a different set of modified control signals to the remaining transistors 718 included in the second resistive element 706. The different set of modified control signals may be used to create a resistive element (using the remaining transistors 718) having a different impedance, which is the impedance created by the remaining transistors 716 of the first resistive element 702 modified (e.g., multiplied or divided) by the scaling factor.

When the logic enable signal, ENABLE, coupled to the math logic 714 is not asserted the remaining transistors 718 included in the second resistive element 706 may receive an unmodified version the control signals p1–p7, n1–n7 from the math logic 714 that serve to selectively activate or de-activate one or more of the stacked transistor pairs in the remaining transistors 718 to create a resistive element using the remaining transistors 718 having the same impedance created by the remaining transistors 716 of the first resistive element 702.

The transistor enable logic 707 may receive a secondary control signal (e.g., ENABLE). When the enable logic 707 receives the enable signal, ENABLE, the logic 707 may modify the secondary control signal, and output control signals (e.g., modified secondary control signals) to one or more stacked transistor pairs (e.g., P0D-N0D) included in the default stacked fingered transistor pair 712. For example, the enable logic 707 may receive a secondary control signal ENABLE as an input and output modified secondary control signals ENABLE and not ENABLE to the transistors included in the stacked transistor pair P0D-N0D, respectively. The modified secondary control signals may serve to selectively activate or de-activate one or more stacked transistors (e.g., P0D-N0D) included in the default stacked fingered transistor pair 712. The structure of the default stacked fingered transistor pair 712 is changed from that of the default stacked fingered transistor pair 710, and therefore the impedance of the default stacked fingered transistor pair 712 may be the impedance of the default stacked fingered transistor pair 710 modified by a scaling factor.

In one embodiment, the numerator of the scaling factor provided by the enable logic 707 may be the number of stacked transistor pairs (e.g., P0A-N0A) included in the default stacked fingered transistor pair 712 when the ENABLE signal is low and the denominator of the scaling factor provided by the enable logic 707 may be the number of stacked transistor pairs (e.g., P0A-N0A) that are activated in the default stacked fingered transistor pair 712 when the ENABLE signal is high. In the exemplary scalable termination logic 700, the enable logic 707 may deactivate the stacked transistor pair P0D-N0D and therefore, scale the impedance of the default stacked fingered transistor pair 712 by 4/5 when ENABLE is asserted.

When the enable logic 707 is not enabled by the logic enable signal, ENABLE, the default stacked fingered transistor pair 712 may receive a second version of the modified secondary control signals from the enable logic 707 that serves to selectively activate or de-activate one or more of the stacked transistor pairs (e.g., stacked P0D-N0D to create a default stacked fingered transistor pair 712 having the same impedance as the default stacked fingered transistor pair 710 included in the first resistive element 702.

The math logic 714 and the enable logic 707 are activated by the same enable signal, ENABLE. Therefore, the math logic 714 may modify or adjust the impedance of the remaining transistors (e.g., stacked transistor pairs P1-N1 to P7-N7) 718 included in the second resistive element 706 while the transistor enable logic 707 modifies or adjusts the impedance of the default stacked fingered transistor pair 712 included in the second resistive element 706. Because the default stacked fingered transistor pair 712 is connected in parallel to the remaining transistors 718, the value of the scaled impedance provided or output on the second port 708 by the second resistive element 706 may be easily determined by one of skill in the art. In one embodiment, the math logic 714 modifies the impedance of the remaining transistors 718 by the same scaling factor that the enable logic 707 modifies the impedance of the default stacked fingered transistor pair 712. Therefore, the impedance created on the second port 708 is the impedance created on the first port 704 modified (e.g., multiplied or divided) by the scaling factor.

The scalable termination logic 700 may use the first resistive element 702 to provide a fixed termination value on a first port 704, and a resistive element (e.g., the remaining transistors 718) coupled to math logic 714 and resistive element (e.g., the default stacked fingered transistor pair 712) coupled to enable logic 707 to provide a variable termination value on a second port 708 using a single set of control signals p1–p7, n1–n7. The default stacked fingered transistor pair 712 may be used for providing a scalable maximum termination value on the second port 708. The remaining transistors 718 may be used for providing a scaled impedance which, when combined with the maximum impedance, serves to reduce the maximum impedance by a certain amount. Because only a single set of control signals p1–p7, n1–n7 are provided to the scalable termination circuit 701, only a single impedance evaluation control circuit 102 is required.

As stated, the scalable termination circuit 701 may scale the impedance provided by the default stacked fingered transistor pair 712 included in the second resistive element 706 and may scale the impedance provided by the remaining transistors (e.g., stacked transistor pairs P1-N1 to P7-N7) 718 included in the second resistive element 706 using a same scaling factor. Therefore, the scalable termination circuit 700 may provide a characteristic impedance on a second port 708 that accurately reflects the characteristic impedance on a first port 704 modified (e.g., multiplied or divided) by the scaling factor.

As stated above, the first and second resistive elements 702, 706 include default fingered transistors (e.g., P0A–P0D, N0A–N0D), respectively, that each correspond to the default transistors P0, N0 included in the resistive element 104 of the programmable termination circuit 100. Because the default transistors included in the programmable termination circuit 100 are large (e.g., wide), the default transistors P0, N0 may be divided into a plurality separate transistors, each of which is 1/N the width of the default transistors P0, N0, where N is the number of transistors included in the plurality, and included in the scalable termination circuit 700 without approaching the design rule minimum required for optimal model accuracy.

The foregoing description discloses only the exemplary embodiments of the invention. Modifications of the above-disclosed embodiments of the present invention which fall within the scope of the invention will be readily apparent to those of ordinary skill in the art. For instance, while the present methods and apparatus disclose the use of fingered transistors that include a group of four transistors (e.g., P0A–P0D, N0A–N0D), in other embodiments the fingered transistors may include a larger or smaller group of transistors. Further, while the present methods and apparatus disclose providing control signals to seven PFET transistors P1–P7 and seven NFET transistors N1–N7, in other embodiments, control signals may be provided to a larger or smaller number of transistors included in the first and second resistive elements 702, 706. Further, while in the above embodiments, a single math logic 714 provides modified control signals to the transistors P1–P7 and N1–N7 included in the second resistive element 706, separate math logic may be employed to provide portions of the modified control signals to the transistors P1–P7, N1–N7, respectively. Although a first termination logic (e.g., the math logic 504, 506) in the above embodiments was always enabled, in other embodiments the math logic 504, 506 may be operatively coupled to and receive an enable signal that serves to activate the math logic 504, 506. Further, the above methods and apparatus may be implemented in a memory system. Although in the above embodiments, control signals, modified control signals, and modified secondary control signals are used to selectively activate or de-activate one or more stacked transistor pairs included in a resistive element, in other embodiments, such signals may be used to selectively activate or de-activate one or more individual transistors included in the resistive element.

Accordingly, while the present invention has been disclosed in connection with exemplary embodiments thereof, it should be understood that other embodiments may fall within the spirit and scope of the invention as defined by the following claims.

The invention claimed is:

1. A memory system comprising:
   a scalable termination circuit having:
      a first resistive element coupled to a first port;
      a second resistive element coupled to a second port;
      a first logic circuit coupled to the first and second resistive elements, and adapted to determine a characteristic impedance of the first port by generating a plurality of binary termination signals; and
      a second logic circuit coupled to the first logic circuit and the second resistive element, and adapted to modify a characteristic impedance of the second port by manipulating one or more of the plurality of binary termination signals.

2. The memory system of claim 1 further comprising a third logic circuit coupled to the second resistive element, and adapted to modify the characteristic impedance of the second port by outputting control signals to the second resistive element.

3. The memory system of claim 2 wherein each of the first and second resistive elements includes a plurality of stacked transistor pairs connected in parallel; and wherein each of the first and second resistive elements includes a default device that is always on, the default device includes a plurality of stacked transistors connected in parallel.

4. The memory system of claim 3 wherein the third logic circuit is further adapted to modify the characteristic impedance of the second port by outputting control signals to one of the plurality of stacked transistor pairs included in the default device of the second resistive element.

5. The memory system of claim 1 wherein the second logic circuit is further adapted to modify the characteristic impedance of the second port by manipulating one or more of the plurality of binary termination signals by performing at least one of a multiplication and division operation on the binary termination signals.

6. The memory system of claim 1 wherein each of the first and second resistive elements includes a plurality of stacked transistor pairs connected in parallel.

7. The memory system of claim 6 wherein each of the first and second resistive elements includes a default device that is always on, the default device includes one or more stacked transistor pairs connected in parallel.

8. A method of providing multiple termination values using a plurality of binary termination signals comprising:
   determining a characteristic impedance of a first port by generating a plurality of binary termination signals at a first logic circuit; and
   modifying a characteristic impedance of a second port by manipulating one or more of the plurality of binary termination signals at a second logic circuit.

9. The method of claim 8 wherein modifying the characteristic impedance of the second port includes modifying the characteristic impedance of the second port by manipulating one or more of the plurality of binary termination signals by performing at least one of a multiplication and division operation.

10. The method of claim 8 further comprising modifying the characteristic impedance of the second port by outputting control signals to a resistive element coupled to the second port.

11. The method of claim 10 wherein modifying the characteristic impedance of the second port includes modifying the characteristic impedance of the second port by outputting control signals to one of a plurality of stacked transistor pairs included in a default device of the resistive element coupled to the second port.

12. A method of providing multiple termination values using a set of control signals comprising:
   employing the set of control signals generated at a first logic circuit to provide a fixed output impedance on a first port; and
   employing the set of control signals at a second logic circuit to provide a variable output impedance on a second port.

13. The method of claim 12 wherein employing the set of control signals to provide a variable output impedance on the second port includes:
   if a first logic circuit is enabled, modifying one or more of the control signals using the first logic circuit thereby creating modified control signals; and
   adjusting the output impedance on the second port using the modified control signals.

14. The method of claim 13 wherein adjusting the output impedance on the second port includes at least one of selectively activating and de-activating one or more of a plurality of stacked transistor pairs included in a resistive element coupled to the second port using the modified control signals.

15. The method of claim 13 further comprising:
   if a second logic circuit is enabled, modifying one or more secondary control signals using the second logic circuit; and
   adjusting the output impedance on the second port using the modified secondary control signals.

16. The method of claim 15 wherein adjusting the output impedance on the second port includes at least one of selectively activating and de-activating one or more of a plurality of stacked transistor pairs included in a default device of a resistive element coupled to the second port using the modified secondary control signals.

17. A memory system comprising:
   a scalable termination circuit having:
      a first resistive element coupled to a first port;
      a second resistive element coupled to a second port;
      an impedance evaluation control circuit coupled to the first and second resistive elements and adapted to employ a set of control signals to provide a fixed output impedance on a first port; and
   first termination adjustment logic coupled to the impedance evaluation circuit and the second resistive element, and adapted to employ the set of control signals to provide a variable output impedance on the second port.

18. The memory system of claim 17 wherein the first termination adjustment logic is further adapted to:
   if the first termination adjustment logic is enabled, modify the set of control signals using the first termination adjustment logic; and
   adjust the output impedance on the second port using the modified set of control signals.

19. The memory system of claim 18 wherein the first termination adjustment logic is further adapted to at least one of selectively activate and de-activate one or more of a plurality of stacked transistor pairs included in the second resistive element using the modified set of control signals to adjust the output impedance on the second port.

20. The memory system of claim 18 further comprising second termination adjustment logic coupled to the second resistive element, and adapted to:
   if the second termination adjustment logic is enabled, modify one or more secondary control signals; and
   adjust the output impedance of the second port using the modified secondary control signals.

21. The memory system of claim 20 wherein the second termination adjustment logic is further adapted to at least one of selectively activate and de-activate one or more of a plurality of stacked transistor pairs included in a default device of the second resistive element using the modified secondary control signals to adjust the output impedance on the second port.

* * * * *